United States Patent [19]

Shirai et al.

[11] Patent Number: 4,951,178
[45] Date of Patent: Aug. 21, 1990

[54] HEADLIGHT FOR MOTOR VEHICLE

[75] Inventors: Katsutada Shirai; Yasushi Otsuka, both of Shizuoka, Japan

[73] Assignee: Koito Manfacturing Co., Ltd., Tokyo, Japan

[21] Appl. No.: 414,497

[22] Filed: Sep. 29, 1989

[30] Foreign Application Priority Data

Oct. 5, 1988 [JP] Japan ................................. 63-131285
Aug. 21, 1989 [JP] Japan ................................. 64-97556

[51] Int. Cl.⁵ ............................................ B60Q 1/00
[52] U.S. Cl. ...................................... 362/61; 362/280; 362/293; 362/319
[58] Field of Search .................. 362/61, 280, 277, 293, 362/307, 319; 350/315, 318

[56] References Cited

U.S. PATENT DOCUMENTS 2,380,849  7/1945  Kolb .
2,963,613  12/1960  Foti .
4,794,494  12/1988  Reeder ........................... 362/293 X

FOREIGN PATENT DOCUMENTS

202802  12/1986  Japan .

Primary Examiner—Stephen F. Husar
Attorney, Agent, or Firm—Sughrue, Mion, Zinn, Macpeak & Seas

[57] ABSTRACT

A headlight for a motor vehicle which can selectively be used as an ordinary headlight or a fog light. A yellow cover is slidably mounted slidable along the axial direction of the bulb of the headlight so that it can be moved between a position where is surrounds the bulb, in which light emitted by the bulb must pass through the cover before reaching the reflector, and a position where the light from the bulb can proceed directly to the reflector without passing through the cover.

17 Claims, 9 Drawing Sheets

FIG. 14

HEADLIGHT FOR MOTOR VEHICLE

BACKGROUND OF THE INVENTION

The present invention relates to a headlight for a motor vehicle, particularly to a headlight having one bulb chamber and which can function not only as an ordinary headlight emitting white light but also as fog light emitting yellow light.

A conventional headlight, having only one bulb chamber and functioning not only as ordinary headlight emitting white light but also as fog light emitting yellow light has been disclosed in commonly assigned Japanese Unexamined Published Utility Model Application No. 202802/86. In this headlight, a cover whose upper half is transparent and achromatic and whose lower half is translucent and yellow is rotated by a half turn around a bulb so that the headlight either functions as ordinary headlight emitting white light or as a fog light emitting yellow light. However, the white light and the yellow light have a tendency to mix with each other so that the function of the headlight as an ordinary headlight and that as a fog light are not distinctly separated from each other. Moreover, if only the upper half of the reflector or bulb is utilized so as to prevent the white light and the yellow light from mixing with each other, the quantity of the light usable for illumination is reduced by half, making the illumination insufficient.

SUMMARY OF THE INVENTION

The present invention was made in order to solve the above-discussed problems. Accordingly, it is an object of the present device to provide a motor vehicle headlight and in which the function of the headlight as an ordinary headlight emitting white light and the function as a fog light emitting yellow light are distinctly separated from each other by preventing the white light and the yellow light from mixing with each other, and the headlight has an illumination capacity equal to that of an ordinary headlight or an ordinary fog light.

In accordance with the above object, a headlight of the present invention includes a reflector, a bulb positioned adjacent the reflector, a yellow cover, and means for slidably moving the cover parallel to the axial direction of the bulb between a first position surrounding at least a portion of the bulb wherein light emitted from the bulb passes through the bulb before reaching the reflector and a second position where the light from the bulb proceeds directly to the reflector without passing through the cover.

Further in accordance with the above object, a headlight provided by the present invention is characterized in that a cylindrical yellow cover is attached to a cover holder and disposed around a headlight bulb concentrically therewith, the cover holder is movably engaged with a guide rail projecting from the top of a case and extending parallel to the axial direction of the bulb and coupled to a moving member engaged with a drive screw extending in the case parallel to the guide rail, and the cover holder is movable backward and forward parallel with the axial direction of the bulb through the action of the moving member by the backward and forward rotation of the drive screw.

Another object of the invention is to provide a headlight for a motor vehicle in which the function of the headlight as an ordinary headlight emitting white light and the function as a fog light emitting yellow light are distinctly separated from each other by preventing the white light and the yellow light from mixing with each other, the illumination capacity is equal to that of an ordinary headlight or an ordinary fog light, and a yellow cover for emitting the yellow light can be easily and securely attached to a cover holder.

In accordance with this object, a headlight provided in accordance with the present invention is characterized in that the open rear end of the yellow cover is fitted in the recess of the projecting portion of the rest of the cover holder, the front portion of the yellow cover is fitted in a support member attached to the body of the cover holder and is supported by the member, the yellow cover is disposed around the bulb concentrically therewith, and the cover holder can be moved backward and forward parallel to the axial direction of the bulb.

DESCRIPTION OF THE PREFERRED EMBODIMENTS

Preferred embodiments of the present invention are hereafter described with reference to the attached drawings.

FIGS. 1–6 show a headlight for a motor vehicle constructed according to a first preferred embodiment of the invention. The headlight has a body 1 having a horizontally slender oblong front portion. A reflector 2 is provided in the headlight body 1, the posture of which can be adjusted. An H4-type halogen bulb 3 whose base is received in a socket is fitted in the rear opening 2a of the reflector 2. A yellow cover 4 is provided around the bulb 3 which can be moved backward and forward in the axial direction of the bulb concentrically therewith.

Figure 1:
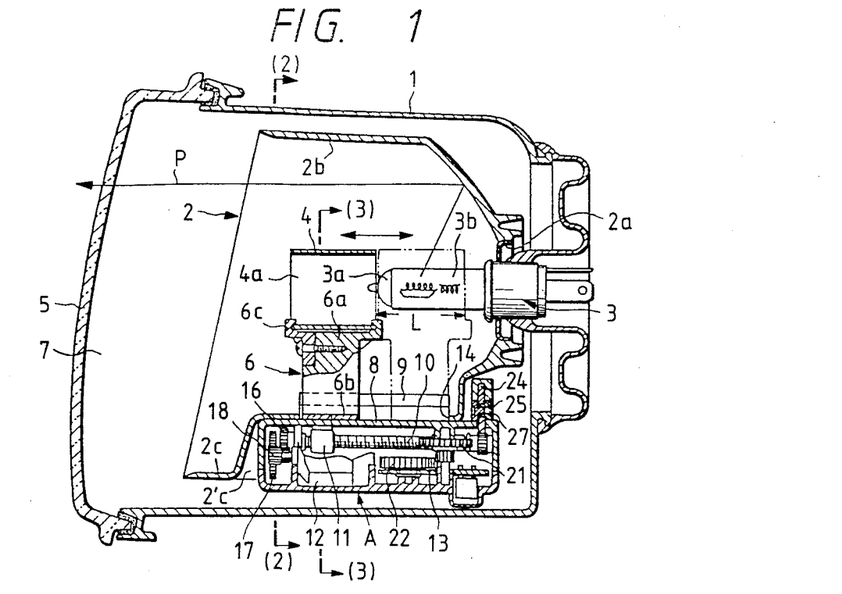
FIG. 1 is an longitudinal sectional view of a headlight constructed according to a preferred embodiment of the present invention.
Figure 2:
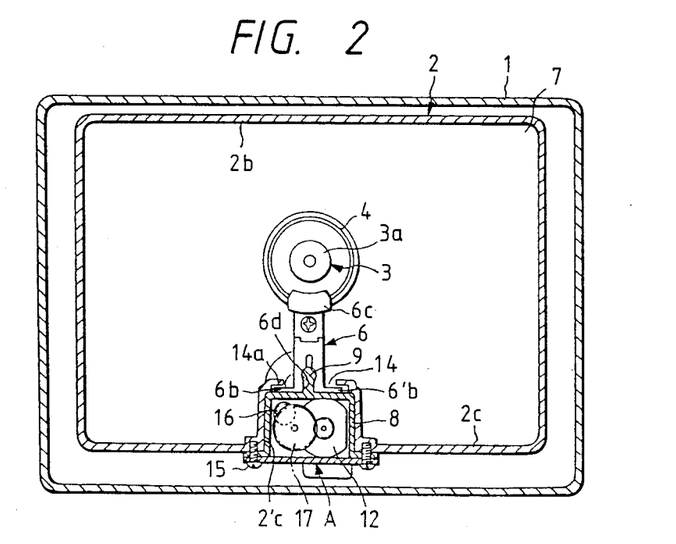
FIG. 2 is a sectional view of the headlight of FIG. 1 taken along a line (2)—(2) in FIG. 1.
Figure 3:
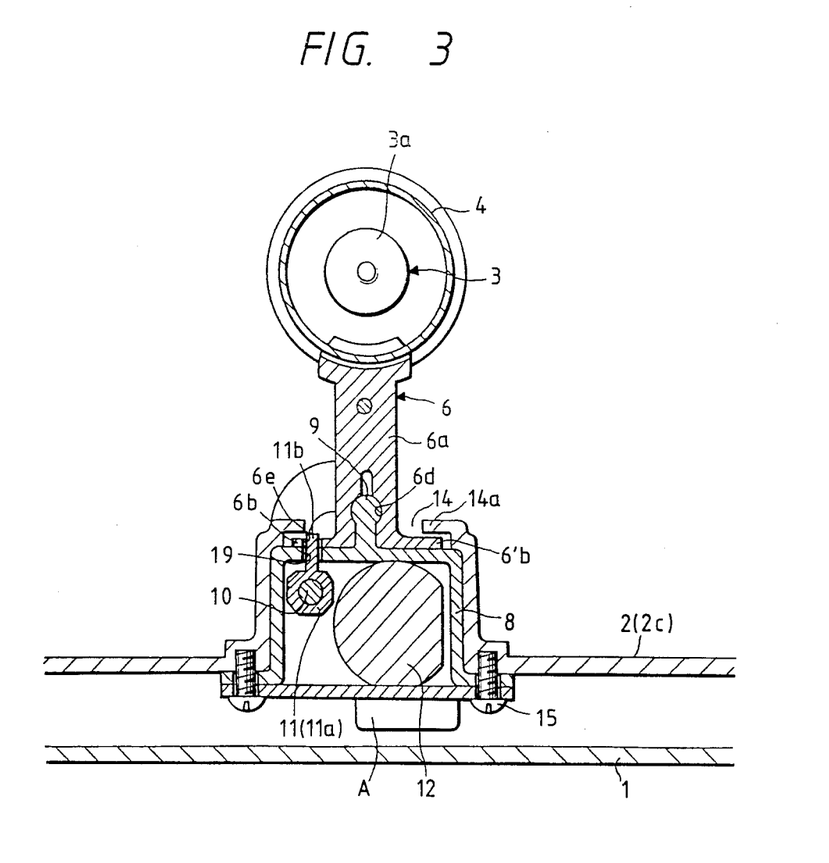
FIG. 3 is an enlarged sectional view of the headlight taken along a line (3)—(3) in FIG. 1.

A front lens 5 is fitted in a front groove in the headlight body 1 so that the only one bulb chamber 7 in the headlight is defined. The front opening of the reflector 2 has a horizontally slender oblong shape corresponding to the shape of the front of the headlight body 1. The upper portion 2b and lower portion 2c of the reflector 2 are flat and do not directly participate in the illumination by the headlight. A control unit A for moving the yellow cover 4 backward and forward in the axial direction of the bulb 3 is provided on the bottom of the lower portion 2c of the reflector 2.

The yellow cover 4 is made of yellow-colored translucent glass or plastic and is cylindrically shaped with the inside diameter of the cover being larger than the outside diameter of the bulb 3. The length of the yellow cover 4 is large enough for the cover to cover almost all of the glass portion 3b of the bulb 3, which has a light blocking front portion 3a. The yellow cover 4 is secured to the cover holder 6 of the control unit A and disposed around the bulb 3 concentrically therewith. The cover 4 can be selectively moved backward and forward in the axial direction of the bulb 3 by the control unit A so that the cover is placed either in a position where it covers almost all of the glass portion 3b of the bulb or in a position where substantially all of the glass portion is uncovered.

Figure 6:
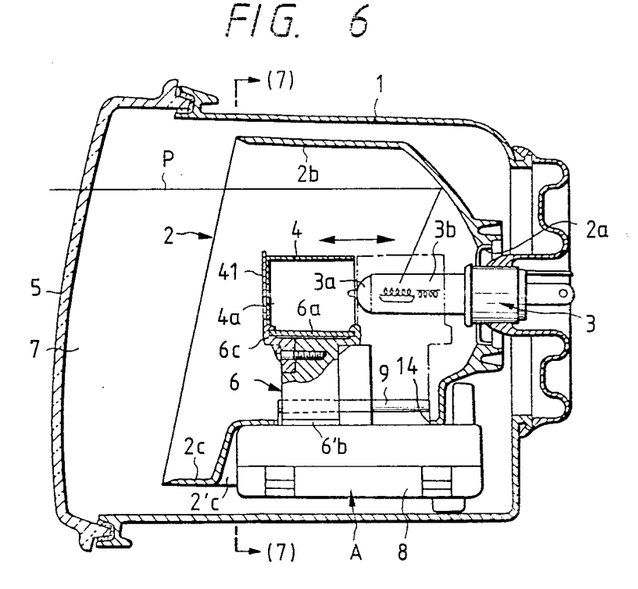
FIG. 6 is a longitudinal sectional view of a modification of the headlight of FIG. 1.
Figure 7:
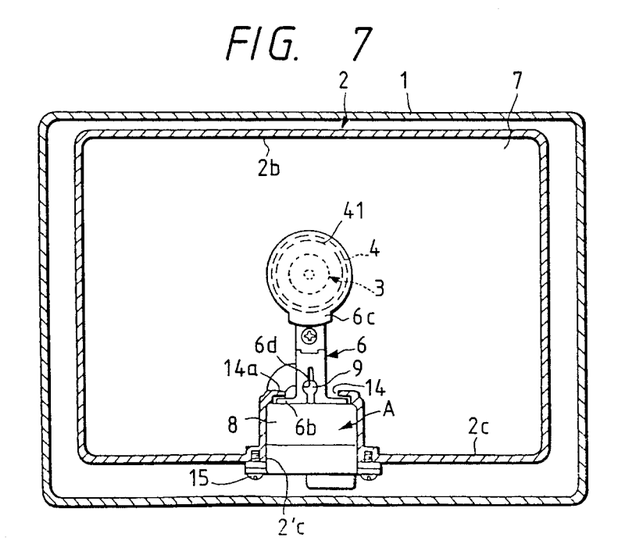
FIG. 7 is a sectional view of the modification of FIG. 6 taken along a line (7)—(7) in FIG. 6.

As shown in FIGS. 6 and 7, a light blocking plate 41 may be provided at the front open end of the yellow cover 4 to keep the cover and the bulb 3 from being visible through the front lens 5 and to thus improve the exterior appearance of the headlight and prevent the headlight from emitting yellow light forward therefrom when functioning as an ordinary headlight or from emitting white light forward therefrom when functioning as a fog light due to a malfunction of the bulb or the cover.

The control unit A includes the cover holder 6, a case 8, a guide rail 9, a drive screw 10, a moving member 11, a motor 12, and a switch circuit 13. The cover holder 6 holds the yellow cover 4. The guide rail 9 projects from the top of the case 8, extending parallel to the axial direction of the bulb 3, and supports the cover holder 6 so that the holder can be moved backward and forward parallel to the axial direction of the bulb. The drive screw 10 is disposed in the case 8 extending parallel to the guide rail 9. The moving member 11 is engaged with the drive screw 10 so that the moving member can be moved by the rotation of the screw to move the cover holder 6 backward and forward parallel to the axial direction of the bulb 3. The screw 10 can be rotated by the motor 12, which is controlled by the switch circuit 13. The control unit A is attached to the lower portion 2c of the reflector 2 at a slender mounting notch 14 therein by screws 15 so that the control unit, except for the cover holder 6, is located in a bottom recess 2'c in the lower portion of the reflector.

Figure 4:
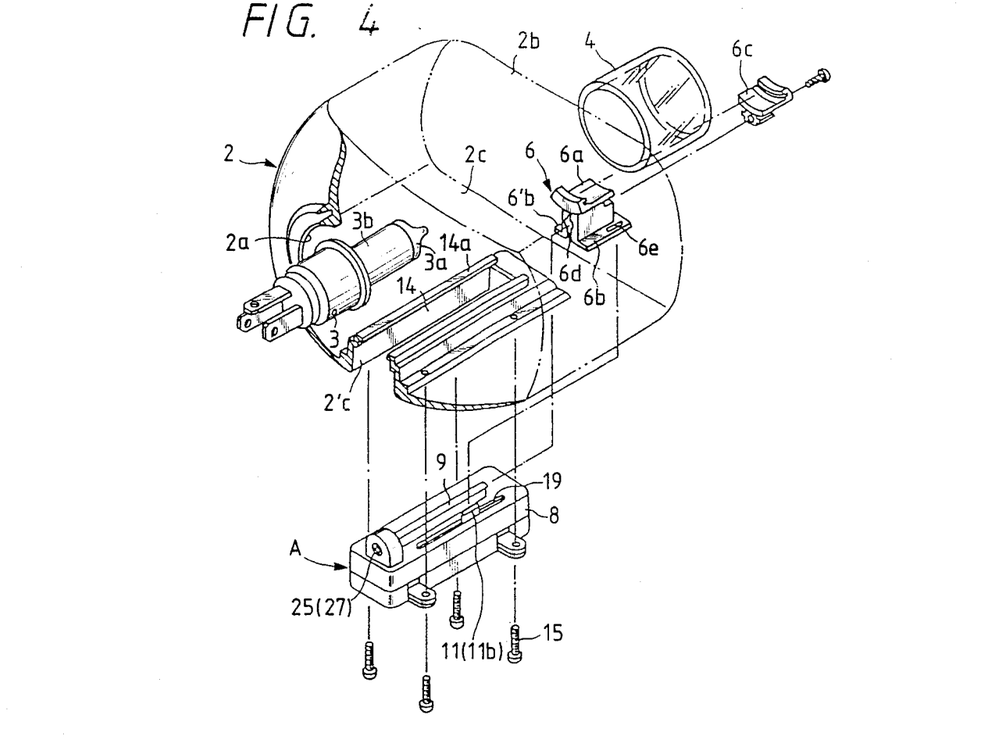
FIG. 4 is a perspective cutaway exploded rear view of a major part of the headlight of FIG. 1.
Figure 5:
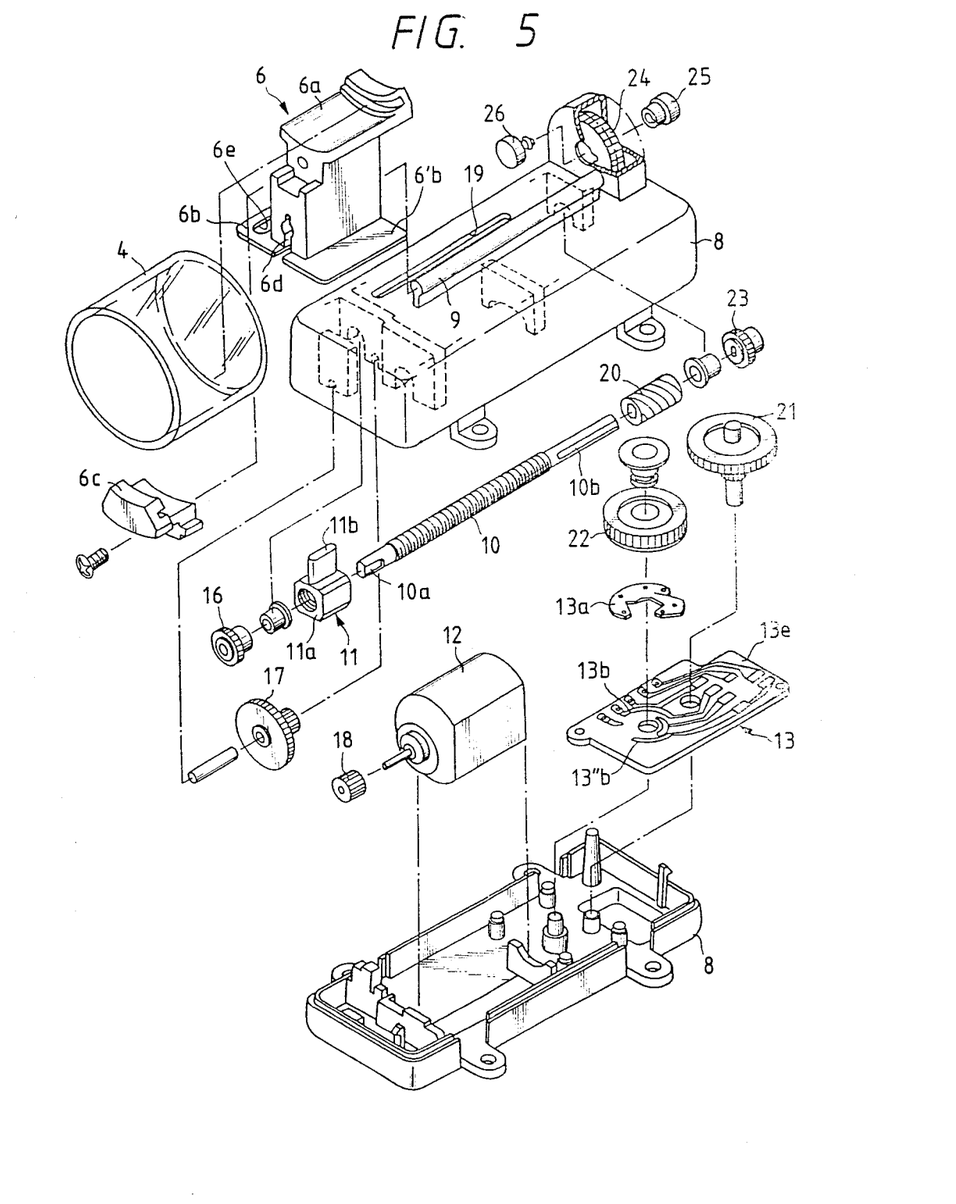
FIG. 5 is a perspective exploded view of a major part of the headlight of FIG. 1.

The cover holder 6 includes a pedestal 6a, support flanges 6b and 6'b, and a mounting member 6c. The pedestal 6a is located over the slender mounting notch 14 in the reflector 2. The yellow cover 4 is secured to the pedestal 6a. The support flanges 6b and 6'b horizontally project rightward and leftward from the bottom of the pedestal 6a, and are held between the top of the case 8 and the edges 14a of the reflector 2 extending along the slender mounting notch 14. The pedestal 6a and the support flanges 6b and 6'b are formed integrally with one another.

The yellow cover 4 is secured to the pedestal 6a by the mounting member 6c. The central portion of the bottom of the pedestal 6a has a groove 6d which extends in the longitudinal direction of the pedestal and in which the guide rail 9 projecting from the top of the case 8 is fitted. The support flange 6b has a coupling hole 6e into which the moving member 11 engaged with the drive screw 10 in the case 8 is inserted so that the moving member is coupled to the cover holder 6. Since the holder 6 is not only engaged with the guide rail 9 and supported thereby so as to be movable backward and forward, but also has the support flanges 6b and 6'b interposed between the top of the case 8 and the edges 14a of the reflector 2 along the slender notch 14 thereof, whereby the holder is prevented from moving or coming off due to external vibration or the like.

The guide rail 9 guides and supports the cover holder 6 so that the holder does not come off but can be moved backward and forward parallel to the axial direction of the bulb 3. The guide rail 9 projects from the central portion of the top of the case 8 and extends parallel to the axial direction of the bulb 3. The guide rail 9 can be formed either integrally with the case 8 or separately therefrom. The cross section of the guide rail 9 is shaped as a keyhole so as to be fittingly received in the groove 6d of the cover holder 6.

The drive screw 10 is disposed in the case 8 extending parallel to the guide rail 9 and mounted so that the screw can be rotated back and forth. A gear 16, which is secured to the screw 10 at one end 10a thereof, is engaged with a speed reduction gear 17, and the latter is engaged with a pinion 18 secured to the motor 12. The moving member 11 for moving the cover holder 6 backward and forward parallel to the axial direction of the bulb 3 is engaged with the drive screw 10 so that the moving member is moved backward and forward by the rotation of the screw.

The moving member 11 includes a nut 11a movably engaged with the drive screw 10, and a coupling portion 11b formed integrally with the nut and inserted into the coupling hole 6e of the support flange 6b of the cover holder 6 so that the moving member is coupled thereto. The coupling portion 11b projects through the slender guide hole 19 of the case 8, which extends in the upper portion of the case immediately over and along the drive screw 10. Since the coupling portion 11b of the moving member 11 is loosely fitted in the coupling hole 6e, the cover holder 6 can be smoothly moved backward and forward even if the positional relationship between the guide rail 9 and the drive screw 10 changes slightly.

Figure 8:
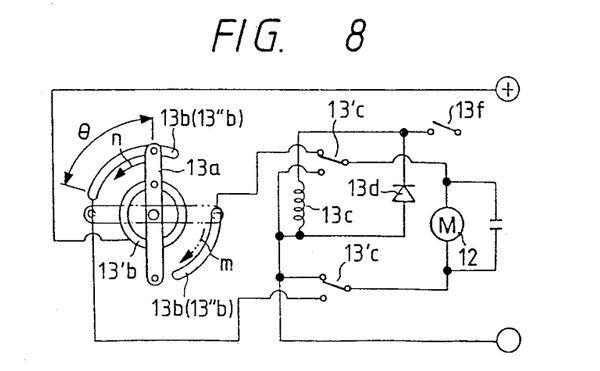
FIG. 8 is a wiring diagram of the switch circuit of the headlight of FIG. 1.

The switch circuit 13 for controlling the motor 12 to rotate the drive screw 10 either backward or forward includes a rotary electrode 13a, a fixed electrode 13b, a relay 13c and a diode 13d, as shown in FIGS. 5 and 8. The rotary electrode 13a is secured to the bottom of a spur gear 22 engaged with a gear 21, the latter being engaged with a worm 20 secured to the drive screw 10 at the other end 10b thereof located opposite the end 10a coupled to the motor 12. The fixed electrode 13b, the relay 13c and the diode 13d are provided on a printed circuit board 13e secured in the case 8 of the control unit A. The fixed electrode 13b includes a common portion 13'b a portion 13''b for the forward rotation of the motor 12, and a portion 13'''b for the backward rotation of the motor.

When a control switch 13f provided at the driver's seat or the like is turned on (the state shown in FIG. 8), the relay 13c acts to shift the contacts 13'c thereof so that an electrical current flows from the common portion 13'b of the fixed electrode 13b to the motor 12 through the rotary electrode 13a and the fixed electrode portion 13"b for forward rotation of the motor to thereby cause the motor and the screw 10 to rotate in the forward direction. At that time, the rotary electrode 13a is turned by the rotation of the screw 10 through the action of the spur gear 22 (as shown by an arrow n in FIG. 8). When the rotary electrode 13a is then moved off the fixed electrode portion 13"b (as shown by a two-dot chain line in FIG. 8), the current is cut off so that the motor 12 and the screw 10 are stopped.

When the control switch 13f is thereafter turned off, the contacts 13'c of the relay 13c are shifted again so that an electrical current flows from the common fixed electrode portion 13'b to the motor 12 through the rotary electrode 13a and the fixed electrode portion 13'''b for backward rotation of the motor to thereby cause the motor and the drive screw 10 to rotate in the backward direction. At that time, the rotary electrode 13a is turned by the rotation of the screw 10 through the action of the spur gear 22 (as shown by an arrow m). When the rotary electrode 13a is then moved off the fixed electrode portion 13'''b, the electrical current is cut off so that the motor 12 and the screw 10 are stopped. The length $\theta$ of each of the fixed electrode portions 13"b and 13'''b is determined in accordance with the length of the forward and backward movement of the cover holder 6, the pitch of the screw 10, and the ratio of speed reduction through the worm 20, the gear 21 and the spur gear 22.

A gear 23 is secured to the drive screw 10 at the end 10b thereof and engaged with an auxiliary gear 24 rotatably supported in the case 8 by bearings 25 and 26 coupled to the auxiliary gear so that the auxiliary gear is rotated together with the bearings. The bearing 25 has a groove 27 in which a screwdriver blade can be engaged so that if the motor 12 or the switch circuit 13 develops trouble, the auxiliary gear 24 can be turned with the screwdriver to rotate the drive screw 10 backward and forward through the action of the gear 23 to move the cover holder 6 and the yellow cover 4 backward and forward.

When the bulb 3 is lit when the yellow cover 4 is in the forward position with respect to the cover holder 6 so that the glass portion 3b of the bulb is completely uncovered, light P generated by the bulb proceeds to the reflector 2 directly so that the light is reflected as white light forward from the reflector. The headlight thus functions as an ordinary headlight emitting white light. When the bulb 3 is lit when the yellow cover 4 is positioned backward with respect to the cover holder 6 so that almost all of the glass portion 3b of the bulb is covered by the cover, light P generated by the bulb proceeds to the reflector 2 through the yellow cover so that the light is reflected as yellow light forward from the reflector. The headlight thus functions as a fog light emitting yellow light.

When the headlight constructed in accordance with the present invention is not lit, the headlight appears as an ordinary headlight. That is, the yellow cover of the headlight can be moved either forward or backward in the axial direction of the bulb to cause the headlight to function as an ordinary headlight emitting white light or as a fog light emitting yellow light. Since the white light and yellow light are not mixed with each other, the function of the headlight as an ordinary headlight and as a fog light are distinctly separated from each other. Moreover, because the mechanism for moving the yellow cover backward and forward is easily provided as a compact control unit, the installation space for the headlight and the design thereof are less restricted. Since the mechanism is located under the lower portion of the reflector, whose lower portion does not directly participate in the illumination function of the headlight, the illumination capacity of the headlight is equal to that of an ordinary headlight or an ordinary fog light. Due to the fact that the cover holder for the yellow cover is supported by a guide rail so that the holder can be moved backward and forward through the action of the moving member and a drive screw, any dimensional errors in the component parts of the headlight are absorbed so that the cover holder can be more smoothly moved backward and forward than in the case where the cover holder is directly coupled to the drive screw.

FIGS. 9–14 show a headlight for a motor vehicle constructed according to another embodiment of the invention. The headlight has a body 51 having a horizontally slender oblong shape in front. A reflector 52 is provided in the headlight body 51, the posture of which can be adjusted. An H4-type halogen bulb 53 whose base is received in a socket is fitted in the rear opening 52a of the reflector 52. A yellow cover 54 is provided around the bulb 53 which can be moved backward and forward in the axial direction of the bulb concentrically therewith.

Figure 9:
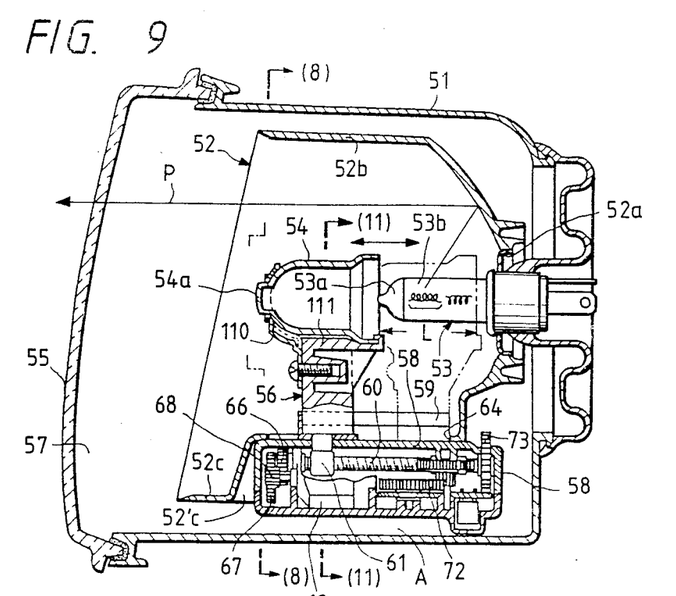
FIG. 9 is a longitudinally sectional view of a headlight constructed according to another embodiment of the present invention.
Figure 10:
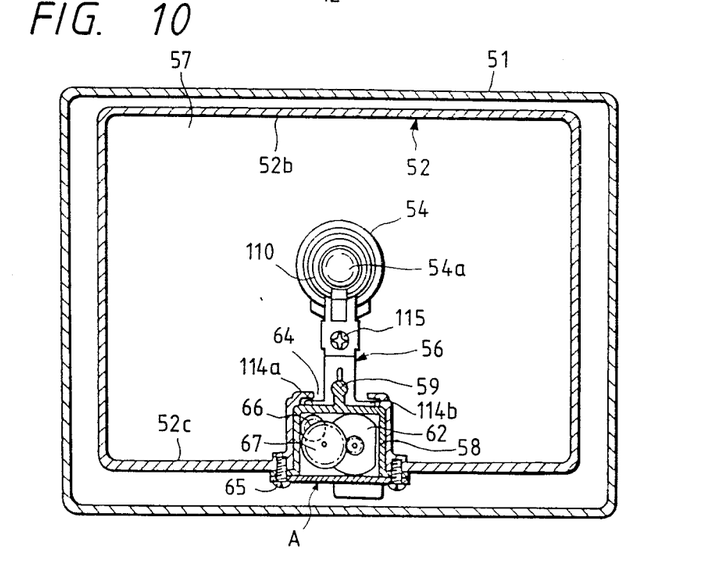
FIG. 10 is a sectional view of the headlight of FIG. 9 taken along a line (10)—(10) in FIG. 9.
Figure 11:
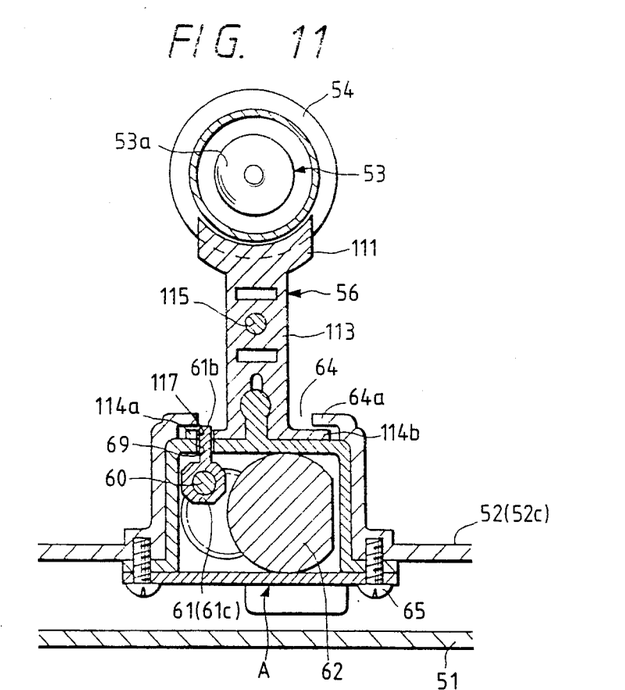
FIG. 11 is an enlarged sectional view of the headlight of FIG. 9 taken along a line (11)—(11) in FIG. 9.

A front lens 55 is fitted in a front groove of the headlight body 51 so that the only one bulb chamber 57 in the headlight is defined. The front opening of the reflector 52 has a horizontally slender oblong shape corresponding to the shape of the front of the headlight body 51. The upper potion 52b and lower portion 52c of the reflector 52 are flat and do not directly participate in the illumination by the headlight. A control unit A for moving the yellow cover 54 backward and forward in the axial direction of the bulb 53 is provided on the bottom of the lower portion 52c of the reflector 52.

The yellow cover 54 is made of yellow-colored translucent glass or plastic and is shaped as a cylindrical cap having a front projection 54a. The inside diameter of the cover is slightly larger than the outside diameter of the bulb 53. The length of the yellow cover 54 is large enough for the cover to cover almost all of the glass portion 53b of the bulb 53, which has a light blocking portion 53a. The cover 54 is secured to the cover holder 56 of the control unit A and disposed around the bulb 53 concentrically therewith. The cover 54 is received on a pedestal 111 of the cover holder 56. The open rear end 54b of the cover 54 is fitted in the recess 112 of the pedestal 111 of the holder 56. The front projection 54a of the cover 54 is supported by a support member 110 having an annular support portion 110a in which the front projection is fitted. The leg 110b of the support member 110 is secured to the body 113 of the cover holder 56 by a screw 115 so that the yellow cover 54 is secured between the cover holder 56 and the support member 110. The cover 54, disposed around the bulb 53 concentrically therewith, can be moved backward and forward in the axial direction of the bulb by the cover holder 56 and the support member 110. The cover 54, disposed around the bulb 53 concentrically therewith, can be moved backward and forward in the axial direction of the bulb by the cover holder 56 of the control unit A so that the cover is either placed in a position covering almost all of the glass portion 53b of the bulb, as shown by a two-dot chain line in FIG. 9, or in a position so as to uncover all of the glass portion, as shown by a solid line in FIG. 9.

The control unit A includes the cover holder 56, a case 58, a guide rail 59, a drive screw 60, a moving member 61, a motor 62, and a switch circuit 63. The cover holder 56 holds the yellow cover 54. The guide rail 59 projects from the top of the case 58, extending parallel to the axial direction of the bulb 53, and supports the cover holder 56 so that the holder can be moved backward and forward parallel to the axial direction of the bulb. The drive screw 60 is disposed in the case 58 extending parallel to the guide rail 59. The moving member 61 is engaged with the drive screw 60 so that the moving member can be moved by the rotation of the screw to move the cover holder 56 backward and forward in parallel with the axial direction of the bulb 53. The screw 60 can be rotated back and forth by the motor 62, which is controlled by the switch circuit 63. The control unit A is attached to the lower portion 52c of the reflector 52 at the slender mounting notch 64 thereof by screws 65 so that the control unit, except for the cover holder 56, is located in the bottom recess 52'c of the lower portion of the reflector.

Figure 12:
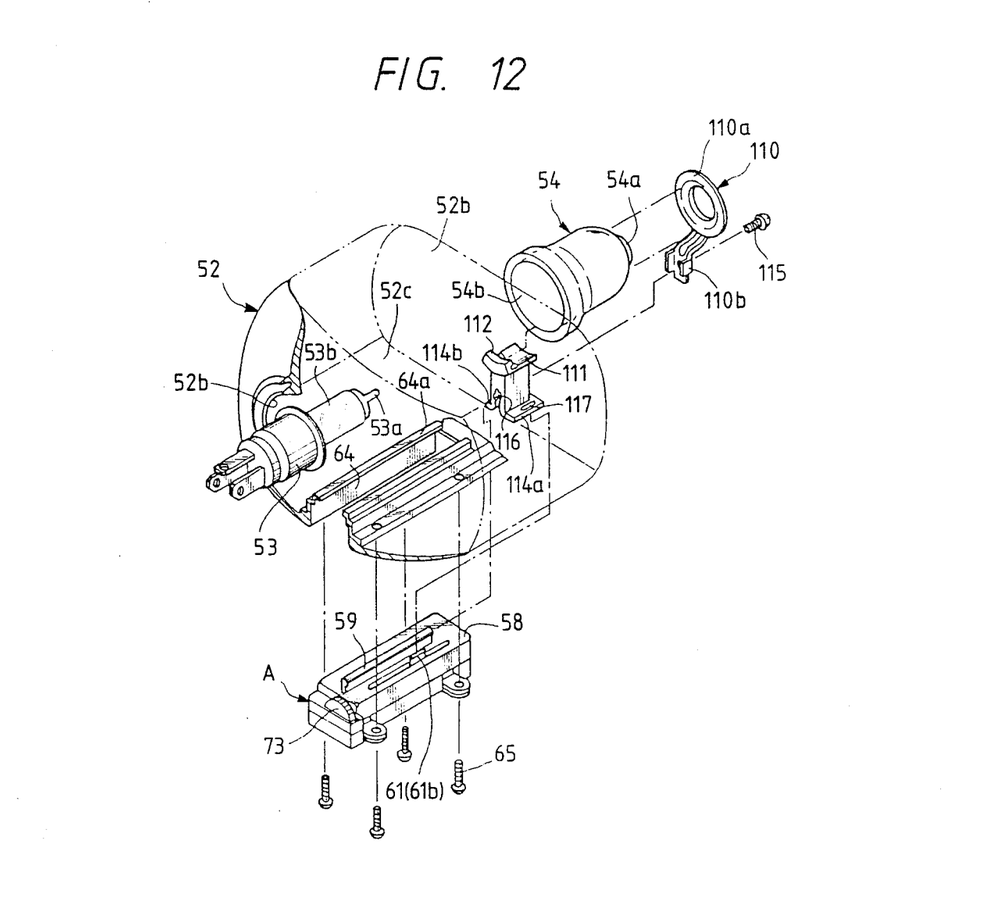
FIG. 12 is a perspective cutaway exploded rear view of a major part of the headlight of FIG. 9.
Figure 13:
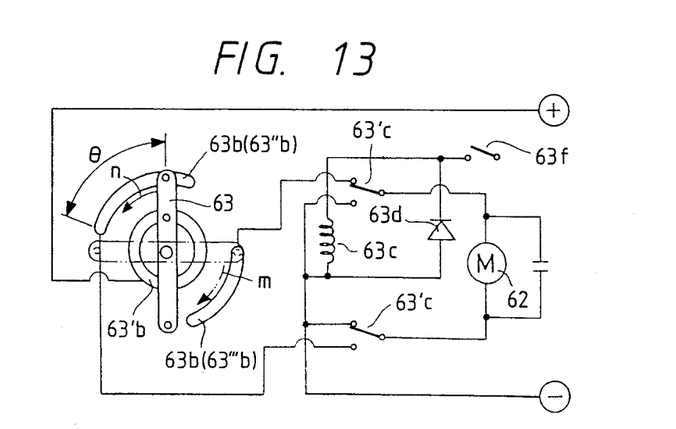
FIG. 13 is a perspective exploded view of a major part of the headlight of FIG. 9.

The cover holder 56 includes the pedestal 111, the recess 112, the body 113, and support flanges 114a and 114b. The pedestal 111 is located over the slender mounting notch 64 of the lower portion 52c of the reflector 52 with the yellow cover 54 placed on the pedestal 111. The recess 112 is provided in the upper part of the rear portion of the pedestal 111, and the open rear end 54b of the cover 54 is fitted in the recess. The body 113 supports the pedestal 111 and is coupled to the guide rail 59. The support member 110, in which the front projection 54a of the cover 54 is fitted for support, is secured to the body 113. The support flanges 114a and 114b horizontally project rightward and leftward from the bottom of the body 113 and are held between the top of the case 58 of the control unit A and edges 64a of the reflector 52 along the notch 64. The pedestal 111, the recess 112, the body 113 and the support flanges 114a and 114b are formed integrally with each other. The cover 54 is placed on the pedestal 111 and fitted in the recess 112 so that the cover is pinched between the upper part of the rear portion of the pedestal 111 and the support member 110. The central portion of the bottom of the body 113 has a horizontal groove 116 in which the guide rail 59 projecting from the top of the case 58 of the control unit A is fitted. The support flange 114a has a coupling hole 117 into which the moving member 61 engaged with the drive screw 60 in the case 58 is inserted to couple the moving member to the flange. Since the cover holder 56 is not only engaged with the guide rail 59 and supported thereby so as to be movable backward and forward but also has the support flanges 114a and 114b interposed between the top of the case 58 and the edges 64a of the reflector 52 along the mounting slender notch 64 thereof, the holder is prevented from moving or coming off due to external vibration or the like. The guide rail 59 guides and supports the holder 56 so that the holder cannot come off but can be moved backward and forward parallel to the axial direction of the bulb 53. The guide rail 59 projects from the central portion of the top of the case 58 of the control unit A and extends parallel to the axial direction of the bulb 53. The guide rail 59 can be formed either integrally with the case 58 or separately therefrom. The cross section of the guide rail 59 is shaped as a keyhole to be fittingly received in the groove 116 of the cover holder 56.

The drive screw 60 is disposed in the case 58 extending parallel to the guide rail 59 and mounted so that the screw can be rotated back and forth. A gear 66, which is secured to the screw 60 at one end 60a, is engaged with a speed reduction gear 67, and the latter is engaged with a pinion 68 secured to the motor 62, the moving member 61 for moving the cover holder 56 backward and forward parallel to the axial direction of the bulb 53 is engaged with the drive screw 60 so that the moving member is moved backward and forward by the rotation of the screw.

The moving member 61 includes a nut 61a movably engaged with the drive screw 60, and a coupling portion 61b formed integrally with the nut and inserted into the coupling hole 117 of the support flange 114a of the cover holder 56 so that the moving member is coupled thereto. The coupling portion 61b projects through the slender guide hole 69 of the case 58, which extends in the upper portion of the case immediately over and along the drive screw 60. Since the coupling portion 61b of the moving member 61 can be loosely fitted in the coupling hole 117, the cover holder 56 is smoothly moved backward and forward even if the positional relationship between the guide rail 59 and the drive screw 60 changes slightly.

Figure 14:
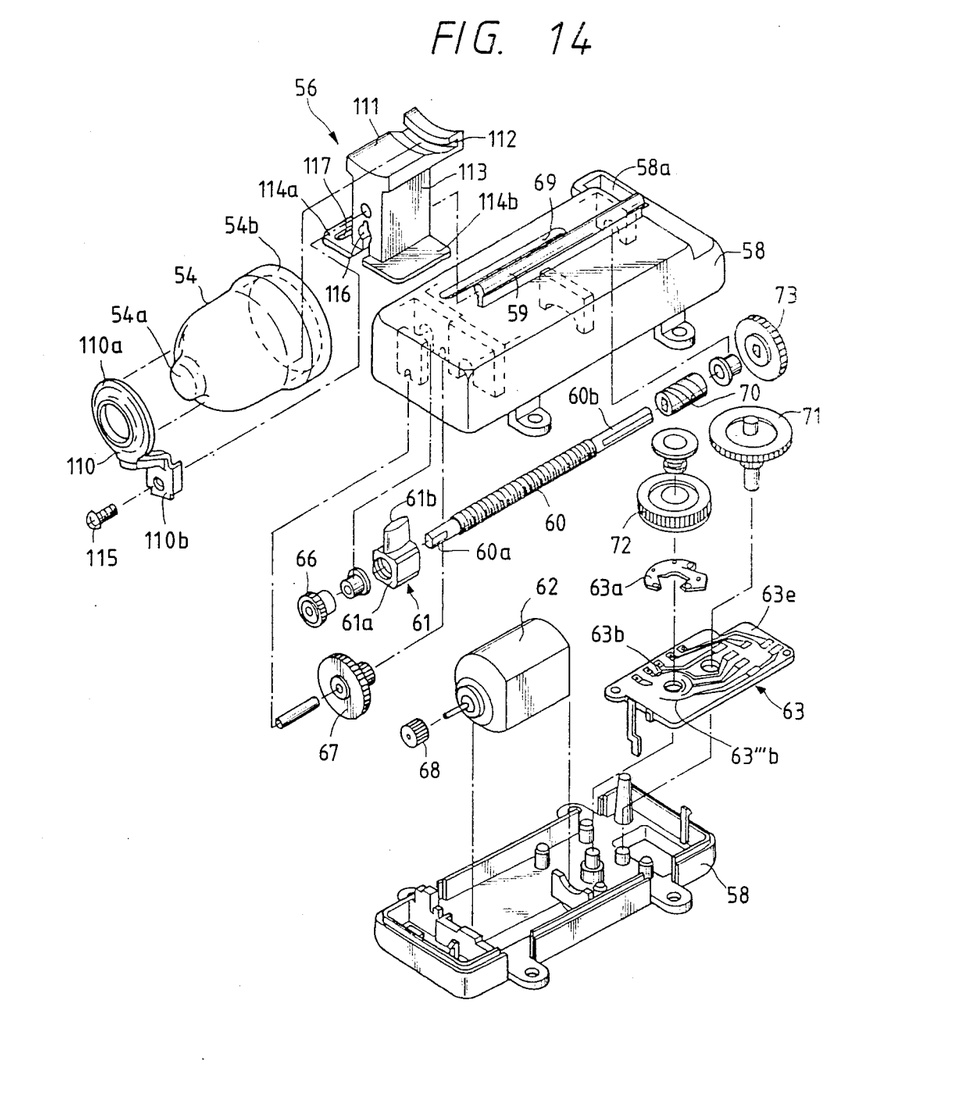
FIG. 14 is a wiring diagram of the switch circuit of the headlight of FIG. 9.

The switch circuit 63 for controlling the motor 62 to rotate the drive screw 60 either backward or forward includes a rotary electrode 63a, a fixed electrode 63b, a relay 63c and a diode 63d, as shown in FIGS. 13 and 14. The rotary electrode 63a is secured to the bottom of a spur gear 72 engaged with a gear 71 engaged with a worm 70 secured to the drive screw 60 at the other end 60b thereof, which is located opposite the end 60a coupled to the motor 62. The fixed electrode 63b, the relay 63c and the diode 63d are provided on a printed circuit board 63e secured in the case 58 of the control unit A. The fixed electrode 63b includes a common portion 63b, a portion 63"b for the forward rotation of the motor 62 and a portion 63'''b for the backward rotation of the motor. When a control switch 63f provided at the driver's seat or the like is turned on (the state shown in FIG. 14), the relay 63c acts to shift the contacts 63'c thereof so that an electrical current flows from the common portion 63'b of the fixed electrode 63b to the motor 62 through the rotary electrode 63a and the fixed electrode portion 63"b to cause the motor and the screw 60 to rotate in the forward direction. At that time, the rotary electrode 63a is turned by the rotation of the screw 60 through the action of the spur gear 72 (as shown by an arrow n in FIG. 14). When the rotary electrode 63a is then moved off the fixed electrode portion 63"b (as shown by a two-dot/chain line in FIG. 16), the electrical current is cut off so that the motor and the screw 60 are stopped.

When the control switch 63f is thereafter turned off, the contacts 63'c of the relay 63c are shifted again so that an electrical current flows from the common fixed electrode portion 63'b to the motor 62 through the rotary electrode 63a and the fixed electrode portion 63'''b to cause the motor and the drive screw 60 to rotate in the backward direction. At that time, the rotary electrode 63a is turned by the rotation of the screw 60 are stopped. The length $\theta$ of each of the fixed electrode portions 63"b and 63'''b is determined in accordance with the length of the forward and backward movement of the cover holder 56, the pitch of the screw 60, and the ratio of speed reduction through the worm 70, the gear 71, and the spur gear 72.

A gear 73 is secured to the drive screw 60 at the end 60b thereof and partly projects from the hole 58a in the top of the case 58 so that the gear can be rotated manually. For that reason, if the motor 62 or the switch circuit 63 develops trouble, the drive screw 60 can be rotated backward and forward through the action of the gear 73 by manual action to move the cover holder 56 and the yellow cover 54 backward and forward.

When the bulb 53 is lit when the yellow cover 54 is in the forward position with respect to the cover holder 56 so that the glass portion 53b of the bulb is completely uncovered, light P generated by the bulb proceeds to the reflector 52 directly so that the light is reflected as white light forward from the reflector. The headlight thus functions as an ordinary headlight emitting white light. When the bulb 53 is lit when the yellow cover 54 is positioned backward with respect to the cover holder 56 so that almost all of the glass portion 53b of the bulb is covered by the cover, light P generated by the bulb proceeds to the reflector 52 through the yellow cover so that the light is reflected as yellow light forward from the reflector. The headlight thus functions as a fog light emitting yellow light.

When a headlight in accordance with this embodiment of the invention is not lit, the headlight appears as an ordinary headlight. The yellow cover of the headlight can be moved either forward or backward in the axial direction of the bulb to cause the headlight to function as an ordinary headlight emitting white light as a fog light emitting yellow light. Since the white light and the yellow light do not mix with each other, the function of the headlight as an ordinary headlight and that of the headlight as a fog light are distinctly separated from each other. Since the open rear end of the yellow cover is fitted in the recess of the pedestal of the cover holder of the headlight and the front end of the yellow cover is engaged with a support member secured to the body of the holder and supported by the support member, the cover can be easily and securely attached to the holder.

What is claimed is:

1. A headlight for a motor vehicle, comprising:
   reflector;
   a bulb positioned adjacent said reflector;
   a yellow cover; and
   means for slidably moving said cover parallel to an axial direction of said bulb between a first position surrounding at least a portion of said bulb where light from said bulb passes through said cover before reaching said reflector and a second position where light from said bulb proceeds directly to said reflector without passing through said cover.

2. The headlight for a motor vehicle of claim 1, wherein said moving means comprises a drive screw extending parallel to said axial direction.

3. The headlight for a motor vehicle of claim 1, wherein said moving means comprises a cover holder to which said cover is fixed, a guide rail extending parallel to said axial direction, a drive screw extending parallel to said axial direction, and a moving member engaged with said drive screw and said holder for moving said holder backward and forward parallel to said axial direction upon rotation of said screw.

4. The headlight for a motor vehicle of claim 1, wherein at least a portion of said moving means is disposed within a recess in said reflector.

5. The headlight for a motor vehicle of claim 1, wherein said cover is cylindrical in shape and has a longitudinal axis aligned with said axial direction of said bulb.

6. The headlight for a motor vehicle of claim 5, further comprising a light blocking plate provided at a front open end of said cover.

7. The headlight for a motor vehicle of claim 3, wherein said cover has an open rear end fitted in a recess in a projection portion of said cover holder, and further comprising a support member for attaching a front portion of said cover to said cover holder.

8. A headlight for a motor vehicle, comprising:
   (1) a reflector;
   (2) a bulb positioned adjacent said reflector:
   (3) a yellow cover; and
   (4) a mechanism for slidably moving said cover parallel to an axial direction of said bulb between a first position concentrically surrounding at least a portion of said bulb so that light from said bulb passes through said cover before reaching said reflector and a second position where light from said bulb proceeds directly to said reflector without passing through said cover, said mechanism comprising:
   (a) a case mounted within a recess in said reflector, said case having a longitudinally extending guide hole formed therein extending in said axial direction and aligned with a notch in said reflector;
   (b) a guide rail formed on said case extending parallel to and adjacent said guide hole and extending into said notch:
   (c) a drive screw disposed in said case and extending parallel to said guide hole;
   (d) motor means for rotating said drive screw:
   (e) a moving member threadedly engaged with said drive screw and having an engaging portion extending through said guide hole; and
   (f) a holder having a pedestal portion supporting said cover a recess being formed in a lower portion of said holder slidably fitted on said guide rail, said engaging portion being engaged with said holder to slide said holder along said guide rail as said drive screw is rotated.

9. The headlight for a motor vehicle of claim 8, wherein said cover is cylindrical and has a longitudinal axis aligned with said axial direction.

10. The headlight for a motor vehicle of claim 8, wherein said cover has an open rear end, and said pedestal portion of said holder has a projection portion with a recess, said open rear end being fitted in said recess.

11. The headlight for a motor vehicle of claim 10, further comprising a support member for attaching a front portion of said cover to said holder.

12. The headlight for a motor vehicle of claim 8, wherein said motor means comprises an electric motor and a plurality of speed reduction gears coupling an output shaft of said motor to said drive screw.

13. The headlight for a motor vehicle of claim 8, further comprising a gear coupled to said drive shaft to rotate with said drive shaft, an auxiliary gear engaged with said gear, and a bearing rotatably supported by said case and coupled to said auxiliary gear to rotate therewith, said bearing having a portion outside of said case and a groove formed therein for receiving a screwdriver blade.

14. The headlight for a motor vehicle of claim 8, further comprising an auxiliary gear coupled to said drive shaft to rotate with said drive shaft, said auxiliary gear partly projecting from said case.

15. The headlight for a motor vehicle of claim 8, further comprising switch means for controlling a direction of current flow through said motor to control a direction of rotation of said motor and said drive screw in response to a control signal for switching between an ordinary headlight and a fog light state of said headlight, said switch means comprising means for shutting off a flow of current to said motor when said cover holder reaches end positions thereof along said drive screw.

16. The headlight for a motor vehicle of claim 15, wherein said switch comprises a movable electrode and a plurality of fixed electrodes, and said shutting off means comprises gear means for transmitting rotational motion of said drive screw to said movable electrode.

17. The headlight for a motor vehicle of claim 8, wherein said holder has a pair of support flanges slidably received between a top of said case and edge portions of said reflector along said notch.

* * * * *